United States Patent

Korpel

[15] 3,706,965
[45] Dec. 19, 1972

[54] REAL-TIME ACOUSTIC IMAGING SYSTEM

[72] Inventor: Adrianus Korpel, Prospect Heights, Ill.

[73] Assignee: Zenith Radio Corporation, Chicago, Ill.

[22] Filed: Aug. 4, 1971

[21] Appl. No.: 169,019

[52] U.S. Cl. ..........340/5 MP, 73/67.5 H, 178/7.5 R, 332/7.51, 340/5 H
[51] Int. Cl. ............................................G01n 29/00
[58] Field of Search ...........340/5 MP, 5 H; 332/7.51; 73/67.5 R, 67.6, 67.7, 67.5 H; 178/7.5 R

[56] References Cited

UNITED STATES PATENTS

| | | | |
|---|---|---|---|
| 3,585,848 | 6/1971 | Korpel | 73/67.5 |
| 3,633,407 | 1/1972 | Whitman | 340/5 H |

Primary Examiner—Richard A. Farley
Attorney—John J. Pederson et al.

[57] ABSTRACT

To produce an acoustic image or hologram of an object irradiated by acoustic waves, a system includes a sheet of elasto-optically anisotropic material that responds to the acoustic waves by exhibiting unequal strain-optic coefficients in orthogonal directions related to the path of the acoustic waves. A linearly polarized monochromatic beam of light is projected toward a point in the sheet, while a detector responds to light reflected from the sheet and develops a signal that represents variations caused by the sheet. Disposed in the light path is a quarter-waveplate that converts the original linear polarization into circular polarization. A polarization analyzer, disposed in the light path beyond the sheet and between the quarter-waveplate and the detector, is oriented to select a polarization component of the light that exhibits an amplitude modulation component at the frequency of the acoustic waves.

8 Claims, 4 Drawing Figures

PATENTED DEC 19 1972 3,706,965

Inventor
Adrianus Korpel
By Peter J. Sgarbossa
Attorney

REAL-TIME ACOUSTIC IMAGING SYSTEM

The present invention pertains to acoustic imaging and holographic systems. More particularly, it relates to systems in which an object is irradiated with acoustic waves, and the acoustic waves scattered by the object are probed with a light beam in order to develop a signal that yields information of a detailed nature about the object.

A holographic system enables the recording and reconstruction of the amplitude and phase distribution of a propagating field in a given plane. Imaging, on the other hand, refers to a system which concerns itself only with the amplitude, or rather the power which is proportional to the square of the amplitude. The preservation of phase in holography is of crucial importance in the sence that, upon reconstruction, the field is automatically reproduced faithfully everywhere in space and not only in the plane of the recorder. Thus, in the field of optics, holography has become identified with three-dimensional reconstruction. No such dramatic result or effect is achieved with acoustic holography because acoustic holograms are recorded at the wavelength of sound but are then reconstructed at the wavelength of visible light. Because of this scaling down in wavelength, a faithful three-dimensional reconstruction of the sound field in visible light is only possible if all three dimensions are scaled by a factor corresponding to the ratio between the light and sound wavelengths. For a range of sound frequencies of the order of 1 to 10 megahertz, a demagnification factor from several hundred to several thousand is involved. For convenience, the field is usually reconstructed in such a way that there is no net change of length or width in the two lateral dimensions, and this introduces a longitudinal excess magnification by a factor corresponding to the ratio between the sound and light wavelengths. The effect is similar to the exaggerated depth of field encountered when using binoculars or taking pictures with a telephoto lens.

In optical holography, an image field is made to interfere with a so-called reference beam and the resulting interference pattern is recorded on a photographic, thermoplastic or photochromic film. This pattern consists of a system of fine fringes varying both in contrast and fringe spacing. The contrast at any particular point is a measure of the amplitude of the image field at that point, whereas the positions of the fringes relate to the phase, with their spacing being determined by the slope of the image field wavefront relative to that of the reference beam. Thus, although the recording medium is basically responsive only to light power, it nevertheless is possible to record both light amplitude and light phase by using a reference beam. Reconstruction of the image field is accomplished by illuminating the recorded interference pattern with the original reference beam. Strictly speaking, this generates two related fields (conjugate images) which propagate in different directions and may be separated by spatial filters, a process analogous to the separation of sidebands by electrical filters.

Analogous systems have been used in acoustic holography. A conventional image-conversion device is employed, and an acoustic reference beam is added to the sound field. A pattern of fringes appears on the image conversion device. The fringe pattern is photographed and the developed negative is illuminated with a laser beam. Depending upon the scale of the hologram, various cross-sections of the sound field may be inspected by various known methods. A number of these are described and compared in an article entitled "Acoustic Imaging and Holography" by A. Korpel which appeared in IEEE Spectrum, Vol. 5, No. 10, October 1968, pp 45–52. In the fields of medical diagnosis and non-destructive testing several of these prior systems appear to offer substantial promise for the reconstruction of object information. However, at least in general, they are somewhat basically limited to comparatively small internal viewing angles. In those fields, there also is a need for image converters of larger size, such as from 0.1 to 10 square feet in area.

It is, accordingly, one object of the present invention to provide a new and improved acoustic imaging and holographic system which overcomes the aforementioned size limitations of prior systems.

Another object of the present invention is to provide such a system which enables real-time reproduction.

A further object of the present invention is to provide a new and improved system of the foregoing character in which the system components are not required to meet severe tolerance limitations.

The invention thus relates to a system productive of information representative of an object irradiated by acoustic waves. It includes a sheet of elasto-optically anisotropic material that responds to acoustic waves received along a predetermined path by exhibiting unequal strain-object coefficients in orthogonal directions related to the direction of the path. Acoustic waves are launched toward the sheet along that path and through a medium in which the object is immersed. A linearly polarized monochromatic beam of light is directed toward a point in the sheet, and a detector responds to a portion of the light reflected from the sheet for developing a signal representative of variations in the light effected by action of the sheet. Disposed in the light path is a quarter-waveplate that converts the linear polarization to circular polarization. Finally, a polarization analyzer, disposed in the light path beyond the sheet and between the quarter-waveplate and the detector, is oriented to select a polarization component of the light that exhibits an amplitude modulation component at the frequency of the acoustic waves.

The features of the present invention which are believed to be novel are set forth with particularity in the appended claims. The invention, together with further objects and advantages thereof, may best be understood by reference to the following description taken in connection with the accompanying drawings, in which like numerals denominate like elements, and in which:

Figure 1:
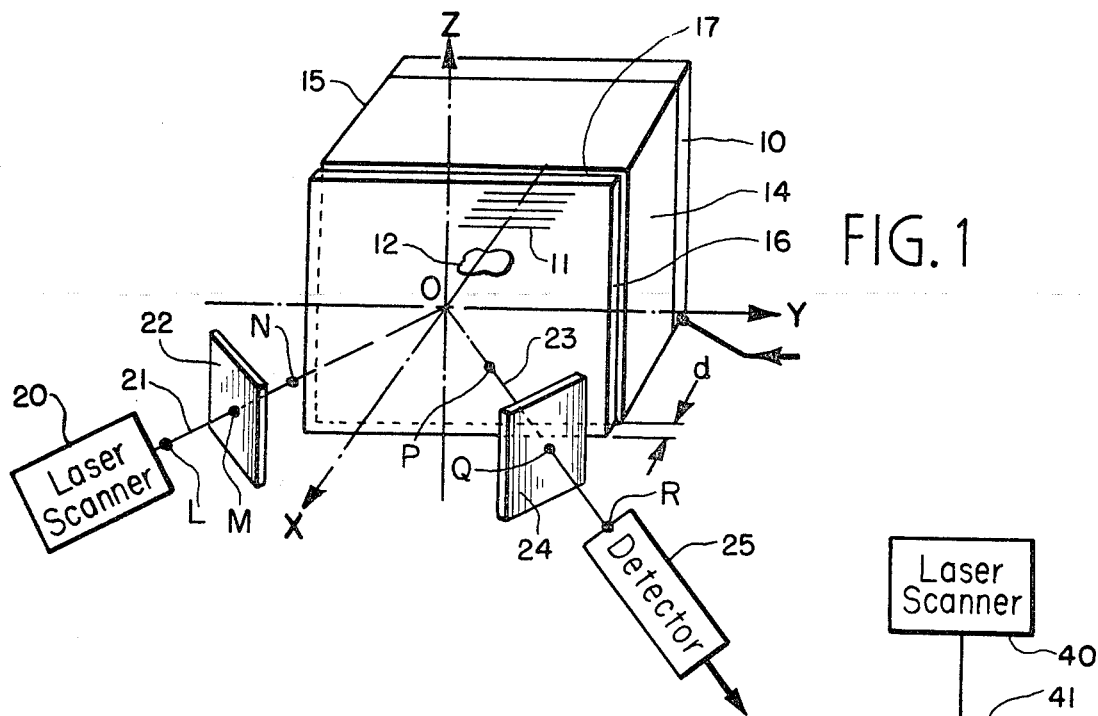
FIG. 1 is a generally schematic perspective view of one embodiment of the present invention.

In FIG. 1, a transducer 10 launches acoustic waves, represented by the pattern of wavefronts 11, toward an object 12 to be examined. Object 12 is immersed in a medium 14, such as water, enclosed by a container 15. The acoustic waves, which propagate in the water, are scattered by object 12 and a portion of the scattered waves impinge upon a sheet 16 of acousto-optically anisotropic material. On the side of sheet 16 facing medium 14 is a film 17 that reflects light. As illustrated, object 12 is on a path directly from transducer 10 to sheet 16; alternatively, these components may be rearranged so that the scattered insonification is by way of reflection from object 12.

Directing or projecting light toward the front surface of sheet 16 is a laser scanner 20 which scans a focused beam of coherent, monochromatic light from a laser in a predetermined raster pattern over sheet 16. For convenience, the scanning raster may be a standard television raster, and the scanning action may be synchronized with a conventional television synchronization system used to display an ultimately developed electrical signal in the manner described in an article entitled "Rapid Sampling of Acoustic Holograms by Laser-Scanning Techniques," by Korpel et al. and which appeared in *The Journal of the Acoustical Society of America*, Vol. 45, No. 4, pp. 881–884, April 1969. The laser scanning system itself preferably is of the acoustic Bragg diffraction type described, for example, in an article "A Television Display Using Acoustic Deflection and Modulation of Coherent Light," by Korpel et al., *Applied Optics*, Vol. 5, No. 10, October 1966, pp. 1667–1675. However, for purposes of understanding the present invention, it is necessary only to examine the manner of operation with respect to a single instantaneous position of the light beam as it sweeps across the face of sheet 16.

From laser scanner 20, the beam of light is projected along a path 21 through an optical quarter-waveplate 22. A portion of the light is reflected by film 17 along a path 23 through an optical polarization analyzer 24 to a photodetector 25. Detector 25 responds to the light by developing an electrical signal which, as indicated above, may be fed to a television-type monitor for reproduction of a visual picture in the manner of the aforementioned 1969 article.

Being conventional, the laser in scanner 20 produces light that is linearly polarized in a given direction at right angles to its path. In a manner known, as such, quarter-waveplate 22 converts that linear polarization to circular polarization. Analyzer 24 selectively passes only light instantaneously exhibiting a polarization vector in a chosen direction radially of reflective light path 23.

Of course, sheet 16 is transparent to the light. By being elasto-optically anisotropic, the change in optical path length due to the acoustic energy within the material of sheet 16 is different for different coordinate components of the polarization of the light. As a result, an orthogonal light component is generated the intensity of which is proportional to stress produced in sheet 16 by the acoustic waves. Viewed another way, the presence of the acoustic energy makes the sheet periodically birefringent. A suitable material is crown glass, a glass containing very little lead. Alternatively, other glasses may be pre-stressed in a manner so as to achieve the effect of elasto-optic anisotropy.

In more detail, a tri-coordinate system of reference is defined in FIG. 1 with an X-axis normal to sheet 16 at the point of incidence of the light on film 17. The Y and Z axes lie in sheet 16 and specifically in its back surface contiguous with film 17. For separation of presentation in the aim of clarity, the same tri-coordinate system is set forth in FIG. 2 which depicts different polarization components in vector form while eliminating any pictorial representation of the different components. The different points L-R along the light paths in FIG. 1, and at which the different components are located, are denominated by the same letters along the light paths in FIG. 2. Thus, the light from laser scanner 20 enters the system at point L located in the XY plane at a point which forms an acute angle, preferably 45°, with respect to the X axis. The light is polarized at an angle of 45° with respect to the Z-axis as indicated by arrow E. For purposes of analysis, the polarized light is resolved into its components $E_2$ parallel to axis Z and $E_1$ which lies in the XY plane and is perpendicular to the direction of propagation.

Quarter-waveplate 22 is situated at point M and is oriented so that its principal axes are respectively parallel to the directions of polarization components $E_2$ and $E_1$. Plate 22 delays component $E_1$ by 90° relative to component $E_2$. This results in the light emerging from plate 22, as indicated at point N, exhibiting circular polarization as represented by a curved arrow 27 that indicates the sense of rotation of the electric polarization vector $E'$. That vector is resolved into its components $E'_1$ and $E'_2$, which components may be expressed in complex notation:

$$E'_2 = E_2 = \frac{1}{\sqrt{2}} E \quad (1)$$

and $$E'_1 = -jE_1 = \frac{-j}{\sqrt{2}} E \quad (2)$$

where $j = \sqrt{-1}$. At point O, the light has traversed thickness $d$ of sheet 16 and is reflected from the backside of sheet 16, in this case specifically by virtue of the presence of reflective layer 17.

Acoustic or sound waves 11 preferably are propagated along a path in the direction of axis X, although other nominal angles of sound incidence may be employed. The sound energy scattered by object 12 induces birefringence in sheet 16 periodically at the sound frequency. That is, the presence of acoustic energy within sheet 16 causes the light component $E'_2$ to experience a slight variation in refractive index $\Delta n_2(t)$ and $E'_1$ similarly is subjected to a variation $\Delta n_1(t)$. By reason of the elasto-optic anisotropy, $\Delta n_1(t)$ is unequal to $\Delta n_2(t)$. With the sound incident on sheet 16 represented by its strain S behind the glass in the liquid:

$$S(t) = S \cos\left(\omega_s t T \frac{2\pi}{\Lambda_s} x\right) \quad (3)$$

where $\omega_s$ is the sound frequency and $\Lambda_s$ is the wavelength of the sound in medium 14. The varying refractive index components $\Delta n_1(t)$ and $\Delta n_2(t)$ may then be expressed by the relationships:

$$\Delta n_1(t) = F(d) G_1(p) S \cos(\omega_s t + \Psi), \text{ and} \quad (4)$$

$$\Delta n_2(t) = F(d) G_2(p) S \cos(\omega_s t + \Psi). \quad (5)$$

In the foregoing, $F(d)$ is a factor which accounts for the resonant nature of the acoustic field in sheet 16. If $d=\frac{1}{2} \Lambda g$, where $\Lambda g$ is the sound wavelength in the material of sheet 16, then $F(d) = 4/\pi$. $\Psi$ denotes the phase of the sound. $G(p)$ is a factor containing the strain-optic parameters $p_{11}$, $p_{12}$ and so forth that describe the elasto-optic behavior of sheet 16. It may be shown that, with sheet 16 being an optically isotropic material such as glass, and with reference to the directions of sound and light shown in FIGS. 1 and 2:

$$G_1(p) = n^3 p_{11}, \quad (6)$$
$$G_2(p) = (\tfrac{1}{2})n^3(p_{11} + p_{12}). \quad (7)$$

In equations (6) and (7), $p_{11}$ and $p_{12}$ describe the elasto-optic behavior of sheet 16 for polarization perpendicular to and parallel with the direction of acoustic wave propagation, respectively. As a result of the action of the acoustic waves, the light components $E''_1$ and $E''_2$ of the reflected light at point P no longer have the same phase relationship as the corresponding components of the incident light at point N. For the exit light components:

$$E''_2 \propto E'_2 \exp[-j 2\pi/\lambda \, \Delta n_2(t) \, 2d \, \sqrt{2}], \quad (8)$$
$$E''_1 \propto E'_1 \exp[-j 2\pi/\lambda \, \Delta n_1(t) \, 2d \, \sqrt{2}]. \quad (9)$$

Making use of the foregoing equations and neglecting common phase vectors:

$$E''_1 = -j \frac{E}{\sqrt{2}} \exp\left[-j \frac{2\pi}{\lambda} 2d\sqrt{2} \cdot \frac{1}{4} n^3(p_{11}-p_{12}) F(d) S \cdot \cos(\omega_s t + \Psi)\right], \quad (10)$$

$$E''_2 = \frac{+E}{\sqrt{2}} \exp\left[+j \frac{2\pi}{\lambda} 2d\sqrt{2} \cdot \frac{1}{4} n^3(p_{11}-p_{12}) F(d) S \cdot \cos(\omega_s t + \Psi)\right]. \quad (11)$$

Further on at point Q in path 23 of the reflected light, analyzer 24 is oriented so as to pass only the components of reflected light in the direction indicated by arrow A which optimally is directed at an angle of 45° to the Z-axis, and thus 90° with respect to the original linear polarization component E. The light passed by analyzer 24 is indicated by vector $E'''$ in FIG. 2, the value of which may be expressed:

$$E''' = \frac{E''_1}{\sqrt{2}} + \frac{E''_2}{\sqrt{2}} = \frac{1}{4} jE \exp \frac{-ja}{2} + \frac{1}{2} E \exp \frac{+ja}{2} \quad (12)$$

where, $$a = \frac{2\pi}{\lambda} d\sqrt{2} n^3 (p_{11}-p_{12}) F(d) S \cos(\omega_s t + \Psi). \quad (13)$$

The light component $E'''$ is received by photodetector 25 located at point R on light path 23. Detector 25 responds to the light by developing an electrical current I that is proportional to the power in the incident light flux according to the relationship:

$$I = \gamma |E'''|^2, \quad (14)$$

where $\gamma$ is a conversion constant descriptive of the action of detector 25. From equation (12) it may be shown that:

$$I = \tfrac{1}{2} \gamma E^2 - \tfrac{1}{2} \gamma E^2 \sin \alpha. \quad (15)$$

The last term of equation (15) represents the useful time-varying part $I_{rf}$ of the total current developed. In any case of practical interest, $\alpha$ is much less than one and $\sin \alpha$ is similar to $\alpha$. Accordingly, equations (12) and (13) yield the approximation:

$$I_{rf} = -\gamma E^2 \pi/\lambda \, d \, \sqrt{2} \, n^3(p_{11}-p_{12}) F(d) S \cos(\omega_s t + \Psi). \quad (16)$$

From equation (16) it may be seen that the resulting detector output current carries information representative of both amplitude (S) and phase ($\Psi$) at the point O of incidence of the light beam upon the back surface of sheet 16.

Figure 2:
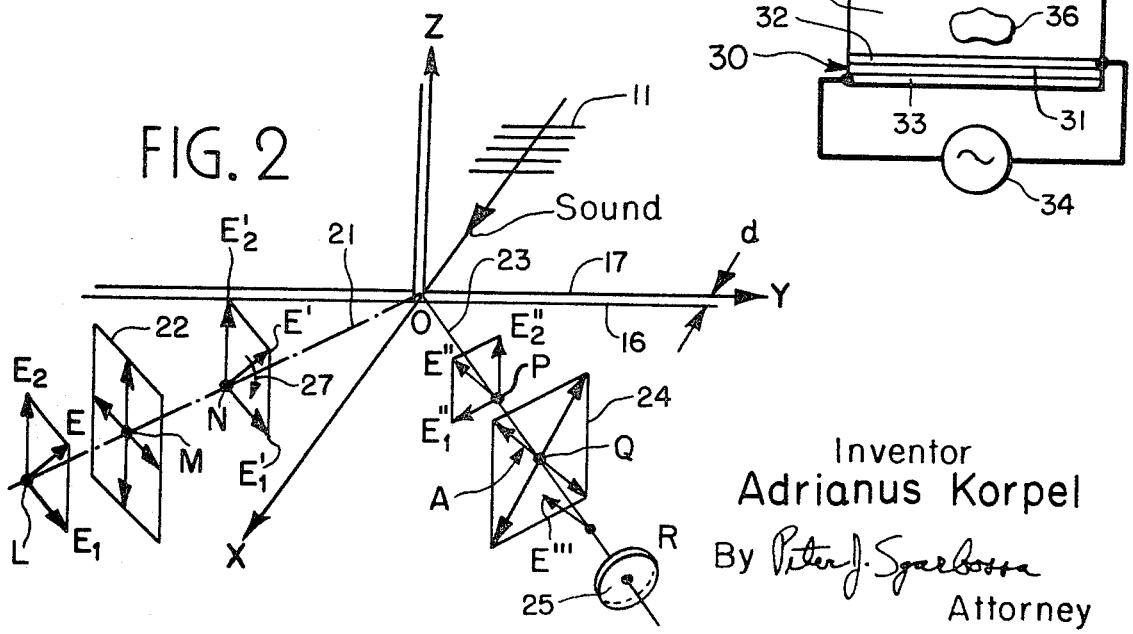
FIG. 2 is a tri-coordinate perspective view representing directions of light and sound travel together with polarization characteristics of the light in the system of FIG. 1.

It may be noted that quarter-waveplate 22 may be located anywhere between points L and Q in FIGS. 1 or 2. That is, plate 22 may be positioned either in the incident or the reflected beam, so long as, in any case, it is positioned ahead of analyzer 24.

Thus, photodetector 25 collects the light transmitted by analyzer 24 and delivers an electrical output signal at the acoustic-wave frequency and which exhibits an amplitude that is proportional to the local sound pressure at the point where the laser beam samples or probes sheet 16. In the complete system wherein the incident laser beam is scanned in a raster pattern across sheet 16, scanner 20, of course, includes a lens to image the exit pupil of the scanner onto detector 25. While the particular angles shown are preferable or optimal, other angles may be used so long as the incident beam arrives at an angle other than normal to sheet 16. The optical portions of the scanning system itself are such that the coverplate is located within the depth of focus of the scanning light beam throughout the raster.

With the incident light beam focused to one-half the acoustic wavelength $\Lambda$, the depth of focus is approximately $(\tfrac{1}{2})\Lambda^2/\lambda$, where $\lambda$ is the light wavelength. It thus is possible to scan over N resolvable points $[(\tfrac{1}{2}) N\Lambda]$, where $(\tfrac{1}{2}) N \Lambda \approx (\tfrac{1}{2}) \Lambda^2/\lambda$, or $N = \Lambda/\lambda$. With acoustic frequencies from 1 to 10 megahertz, the resolution N is then between 3,000 and 300 resolvable points, which is appropriate to television-type display resolution.

Figure 3:
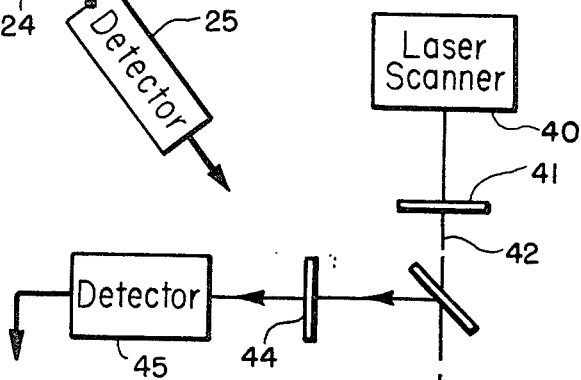
FIG. 3 is a schematic view of an alternative embodiment of the present invention.
Figure 3A:
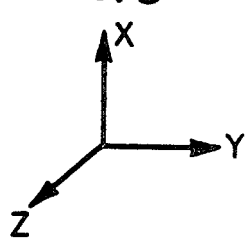
FIG. 3a is a vector diagram useful in connection with the explanation of the operation of the system of FIG. 3.

In the alternative system of FIG. 3, the incident light beam may be incident at right angles to the light-reflective surface. In this case, a transducer 30, composed of a slab of piezoelectric material 31 sandwiched between electrodes 32 and 33, responds to sound-frequency signals from a source 34 and launches compressional waves in a liquid medium 35 toward an object 36. Acoustic energy scattered by object 36 impinges upon a thin reflective film 37 facing medium 35. On the other side of film 37 is a layer or sheet 38 of anisotropic material such as sapphire or glass prestrained in the directions of the Y and Z axes indicated in FIG. 3a and which lie in the plane of the layer 38. Again, the third axis X is in a direction normal to layer 38 and film 37. Of course, these axes are chosen with respect to the crystallographic axes of layer 38. Preferably overlying layer 38 is a block 39 of light-transparent material which may be of substantial thickness, much greater than one-half wavelength at the acoustic frequency. A beam of polarized monochromatic, coherent light from a laser 40 is projected through a quarter-waveplate 41 along a path 42 and through a partially reflective mirror 43 to reflective film 37. A portion of the light reflected by film 37 is directed backwardly along the same path to mirror 43 where it is redirected through an optical polarization analyzer 44 to a photodetector 45.

Anisotropic layer 38 exhibits elasto-optic anisotropy so that a periodic optical phase delay induced by the acoustic energy is different for the directions of polarization along the Y AND Z axes, respectively. In terms of the strain-optic coefficients $p_{13}$ and $p_{12}$, the material is thus characterized by inequality between those two coefficients. With the incident laser beam circularly polarized by quarter-waveplate 41, the exiting or reflected light exhibits a polarization component, in any direction other than those of the Y and Z axes, that is amplitude-modulated at the acoustic frequency. To a degree, it also is proportional to the magnitude of the difference between coefficients $p_{13}$ and $p_{12}$. Again as before, that modulation component is derived by analyzer 44 and passed to detector 45. The optimum orientation of the selective polarization axes of analyzer 44 is at an angle of 45° with respect to both the Y and Z axes (as in this case turned by mirror 43).

In the case of either system disclosed above, the electrical output signal from the photodetector may be displayed by a television-type monitor system, as described in the last-mentioned article, in order to reproduce either a conventional image or a hologram representative of the object under irradiation by the acoustic waves. When used for such purposes as medical observation or non-destructive testing, the approaches discussed permit the viewing of a comparatively large area.

While particular embodiments of the present invention have been shown and described, it is apparent that changes and modifications may be made therein without departing from the invention in its broader aspects. The aim in the appended claims, therefore, is to cover all such changes and modifications as fall within the true spirit and scope of the invention.

I claim:

1. A system productive of information representative of an object irradiated by acoustic waves, comprising:
   a sheet of elasto-optically anisotropic material responsive to acoustic waves received along a predetermined path for exhibiting unequal strain-optic coefficients in orthogonal directions related to the direction of said path;
   means for launching said acoustic waves toward said sheet along said path;
   a medium in which said object is immersed in said path and propagative of said acoustic waves;
   Means for directing linearly polarized monochromatic light toward a point in said sheet;
   detector means, responsive to a portion of said light reflected from said sheet, for developing a signal representative of variations in said light effected by action of said sheet;
   a quarter-waveplate disposed in the light path for converting said linear polarization to circular polarization;
   and a polarization analyzer disposed in the light path beyond said sheet between said quarter-waveplate and said detector means and oriented to select a polarization component modulated at the frequency of said acoustic waves.

2. A system as defined in claim 1 wherein, with reference to an X axis defined as normal to said sheet, said directing means projects and light along a course at an acute angle with respect to said X axis, said launching means orients the path of said acoustic waves at least generally in the direction of the X axis, and said analyzer is oriented to pass selectively components of said light instaneously polarized in a direction forming an acute angle with respect to said X axis.

3. A system as defined in claim 1 in which said sheet is transparent to said light, in which a film reflective of said light is disposed on the surface of said sheet facing said medium, and in which said directing means projects said light through said sheet to said film.

4. A system as defined in claim 1 in which said sheet is optically isotropic and in which said directing means projects and said light toward said sheet at an acute angle with respect to a normal to said sheet.

5. A system as defined in claim 1 in which said sheet effectively is optically non-isotropic and in which said directing means projects said light in a direction perpendicular to said sheet.

6. A system as defined in claim 2 in which said acute angles are substantially 45°.

7. A system as defined in claim 1 in which said sheet has a thickness not greater than one-half wavelength of the acoustic waves in said sheet.

8. A system as defined in claim 5 wherein, with reference to tri-coordinate axes having an X axis normal to said sheet and Y and Z axes lying in said sheet and being chosen with respect to the crystallographic axes of said material, said directing means projects said light substantially along said X axis and orients the polarization of said light at an acute angle with respect to the Y or Z axes, said launching means orients the path of said acoustic waves at least generally in a direction opposite that of said light, and said analyzer is oriented to pass selectively components of said light instantaneously polarized in a direction forming an acute angle with respect to the Y or Z axes.

* * * * *